United States Patent
Lu et al.

(10) Patent No.: US 10,899,231 B2
(45) Date of Patent: Jan. 26, 2021

(54) SYSTEM AND METHOD FOR AVOIDING INRUSH CURRENT IN A VEHICLE MICROGRID

(71) Applicant: FORD GLOBAL TECHNOLOGIES, LLC, Dearborn, MI (US)

(72) Inventors: Xi Lu, Northville, MI (US); Michael W. Degner, Novi, MI (US); Krishna Prasad Bhat, Canton, MI (US); Ke Zou, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 16/354,062

(22) Filed: Mar. 14, 2019

(65) Prior Publication Data

US 2020/0290461 A1    Sep. 17, 2020

(51) Int. Cl.
*B60L 3/04*    (2006.01)
*B60L 55/00*   (2019.01)
*B60L 3/12*    (2006.01)

(52) U.S. Cl.
CPC .................. *B60L 3/04* (2013.01); *B60L 3/12* (2013.01); *B60L 55/00* (2019.02); *B60L 2210/30* (2013.01); *B60L 2210/40* (2013.01)

(58) Field of Classification Search
CPC .... B60L 3/04; B60L 55/00; B60L 3/12; B60L 2210/30; B60L 2210/40
See application file for complete search history.

(56) References Cited

U.S. PATENT DOCUMENTS

| 6,486,644 | B1  |   | 11/2002 | Nemirow |           |
|-----------|-----|---|---------|---------|-----------|
| 9,484,844 | B1  |   | 11/2016 | Floreancig |        |
| 2014/0084818 | A1 | * | 3/2014 | Sugiyama | B60L 53/14 |
|           |     |   |         |         | 318/139   |
| 2015/0217656 | A1 | * | 8/2015 | Loftus | B60L 1/006 |
|           |     |   |         |         | 320/136   |
| 2017/0101029 | A1 | * | 4/2017 | Kawano | B60L 53/51 |
| 2017/0106761 | A1 | * | 4/2017 | Tajima | H02J 7/007 |

FOREIGN PATENT DOCUMENTS

CN    107659183    2/2018

* cited by examiner

*Primary Examiner* — Jared Fureman
*Assistant Examiner* — Duc M Pham
(74) *Attorney, Agent, or Firm* — David B Kelley; Brooks Kushman P.C.

(57) ABSTRACT

A vehicle includes an inverter configured to power an external device. The vehicle further includes a controller programmed to cause the inverter to output a voltage at a steady-state amplitude and a steady-state frequency and, responsive to detecting an inrush current event in progress that is caused by the external device, operate the inverter to reduce the voltage to prevent an overcurrent. The controller is programmed to identify the type of load connected and return the voltage to the steady-state amplitude and steady-state frequency based on the type of load.

20 Claims, 8 Drawing Sheets

SYSTEM AND METHOD FOR AVOIDING INRUSH CURRENT IN A VEHICLE MICROGRID

TECHNICAL FIELD

This application generally relates to a system for operating a vehicle power system to supply power for an external load.

BACKGROUND

Electrified vehicles include electrical power sources such as a battery and a generator. The electrical power sources are used for propulsion and providing power to on-board systems. The power provided to the on-board systems is predefined and generally not extendible to off-board devices. Electrified vehicles may include limited power provision to external devices. For example, the vehicle may provide one or more 12-Volt outlets for providing power to external devices. However, these predefined power outlets provide little flexibility regarding devices that can receive power from the vehicle. Only devices that are compatible with the 12-Volt power output can be plugged in. Many power configurations for external devices are unsupported by typical vehicles.

SUMMARY

A vehicle includes an inverter configured to provide power to an external device. The vehicle further includes a controller programmed to cause the inverter to output a voltage at a steady-state amplitude and a steady-state frequency and, responsive to detecting an inrush current event caused by the external device, reduce an amplitude and a frequency of the voltage to prevent an output current of the inverter from exceeding a threshold, and return the amplitude to the steady-state amplitude and the frequency to the steady-state frequency by increasing the amplitude and the frequency to maintain a constant amplitude to frequency ratio responsive to a profile of the output current being sinusoidal.

The controller may be further programmed to return the amplitude to the steady-state amplitude and the frequency to the steady-state frequency by increasing the amplitude and the frequency such that an amplitude to frequency ratio of the voltage varies while increasing responsive the profile of the output current being non-sinusoidal. The controller may be further programmed to detect an inrush current event responsive to a rate of change of the output current exceeding a predetermined rate of change. The controller may be further programmed to detect an inrush current event responsive to an amplitude of the output current exceeding a predetermined amplitude for greater than a predetermined duration. The threshold may be an overcurrent threshold for the inverter. The controller may be further programmed to, responsive to the output current exceeding the threshold for greater than a predetermined duration, operate the inverter to cease output the voltage. The controller may be further programmed to increase the amplitude to the steady-state amplitude at a predetermined rate. The controller may be further programmed to increase the frequency to the steady-state frequency at a predetermined rate. The controller may be further programmed to increase the amplitude to the steady-state amplitude at a variable rate.

A vehicle system includes a controller programmed to operate an inverter to output a voltage waveform to power an external device and, responsive to detecting connection of the external device followed by an inrush current event caused by the external device, operate the inverter to reduce a frequency and amplitude of the voltage waveform to prevent an output current of the inverter from exceeding a threshold, and increase the frequency and amplitude according to an amplitude to frequency ratio trajectory that is based on a profile of the output current.

The controller may be further programmed to detect the inrush current event responsive to the output current exceeding a current threshold that is greater than a rated current of the inverter. The controller may be further programmed to detect the inrush current event responsive to a rate of change of the output current exceeding a predetermined rate of change. The controller may be further programmed to, responsive to a total harmonic distortion value derived from the profile being less than a predetermined threshold, follow an amplitude to frequency ratio trajectory that defines a constant amplitude to frequency ratio. The controller may be further programmed to, responsive to the profile of the output current being sinusoidal, follow an amplitude to frequency ratio trajectory that defines a constant amplitude to frequency ratio. The controller may be further programmed to, responsive to the profile of the output current being non-sinusoidal, follow an amplitude to frequency ratio trajectory that defines a varying amplitude to frequency ratio.

A method includes, by a controller, operating an inverter to output a voltage at a steady-state amplitude and a steady-state frequency to power an external device. The method further includes reducing an amplitude and a frequency of the voltage to prevent an output current of the inverter from exceeding a threshold, responsive to detecting an inrush current event caused by the external device. The method further includes increasing the amplitude and the frequency to maintain a constant amplitude to frequency ratio responsive to a profile of the output current being sinusoidal to return the amplitude to the steady-state amplitude and the frequency to the steady-state frequency.

The method may further include increasing the amplitude and the frequency with a variable amplitude to frequency ratio responsive to the output current being non-sinusoidal. The method may further include detecting the inrush current event responsive to a rate of change of the output current exceeding a predetermined rate of change. The method may further include detecting the inrush current event responsive to an amplitude of the output current exceeding a predetermined amplitude for a time exceeding a predetermined duration. The method may further include increasing the amplitude and the frequency to maintain a constant amplitude to frequency ratio responsive to the profile of the output current having a total harmonic distortion that is less than a predetermined threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
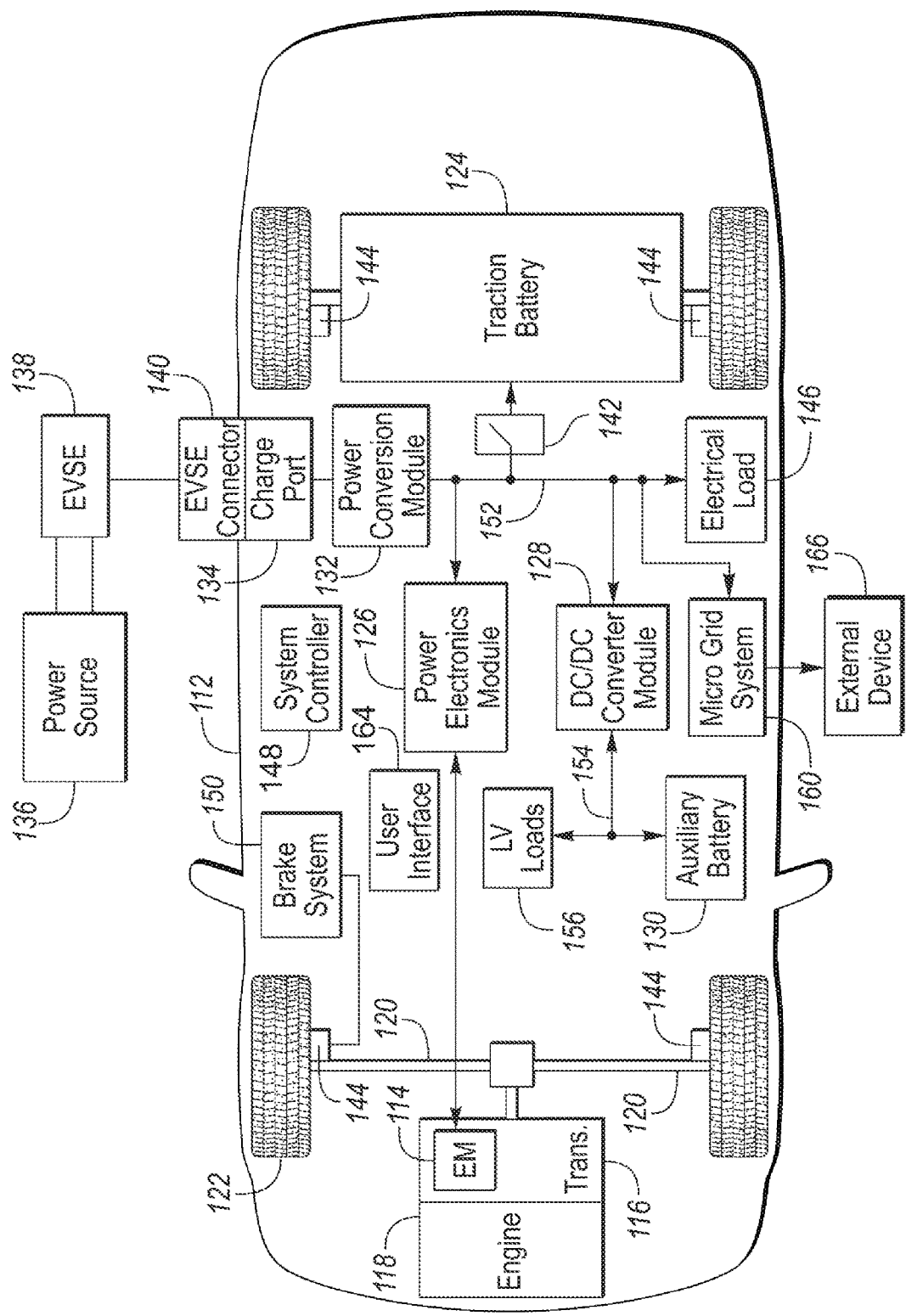
FIG. 1 depicts a possible configuration for an electrified vehicle.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 may be mechanically coupled to a differential 162 that is configured to adjust the speed of drive shafts 120 that are mechanically coupled to drive wheels 122 of the vehicle 112. The drive shafts 120 may be referred to as the drive axle. In some configurations, a clutch may be disposed between the hybrid transmission 116 and the differential 162. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A battery pack or traction battery 124 stores energy that can be used by the electric machines 114. The traction battery 124 may provide a high voltage direct current (DC) output. A contactor module 142 may include one or more contactors configured to isolate the traction battery 124 from a high-voltage bus 152 when opened and connect the traction battery 124 to the high-voltage bus 152 when closed. The high-voltage bus 152 may include power and return conductors for carrying current over the high-voltage bus 152. The contactor module 142 may be integrated with the traction battery 124. One or more power electronics modules 126 may be electrically coupled to the high-voltage bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output from the high-voltage bus 152 to a low-voltage DC level of a low-voltage bus 154 that is compatible with low-voltage loads 156. An output of the DC/DC converter module 128 may be electrically coupled to an auxiliary battery 130 (e.g., 12V battery) for charging the auxiliary battery 130. The low-voltage loads 156 may be electrically coupled to the auxiliary battery 130 via the low-voltage bus 154. One or more high-voltage electrical loads 146 may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger 132. The charger 132 may condition the power supplied from the EVSE 138 to provide the proper voltage and current levels to the traction battery 124 and the high-voltage bus 152. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

The electrified vehicle 112 may include one or more wheel brakes 144 that are provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components. Note that operations and procedures that are described herein may be implemented in one or more controllers. Implementation of features that may be described as being implemented by a particular controller is not necessarily limited to implementation by that particular controller. Functions may be distributed among multiple controllers communicating via the vehicle network.

The vehicle 112 may include a user interface 164 for interfacing with the operator. The user interface 164 may include display elements, such as lamps or a liquid-crystal display (LCD) module. The display elements may include a touch screen. The user interface 164 may further include input devices, such as switches, buttons, or touch-screen inputs.

The vehicle 112 may be configured to provide electrical power for external devices. The vehicle 112 may further include a microgrid system 160. The microgrid system 160 may be a vehicle system that is configured to provide electrical power to one or more external devices 166. The microgrid system 160 may receive power from the high-voltage bus 152 and the traction battery 124. The microgrid system 160 may include power conversion circuitry to generate an output voltage and current for external devices that are connected to the microgrid system 160.

Figure 2:
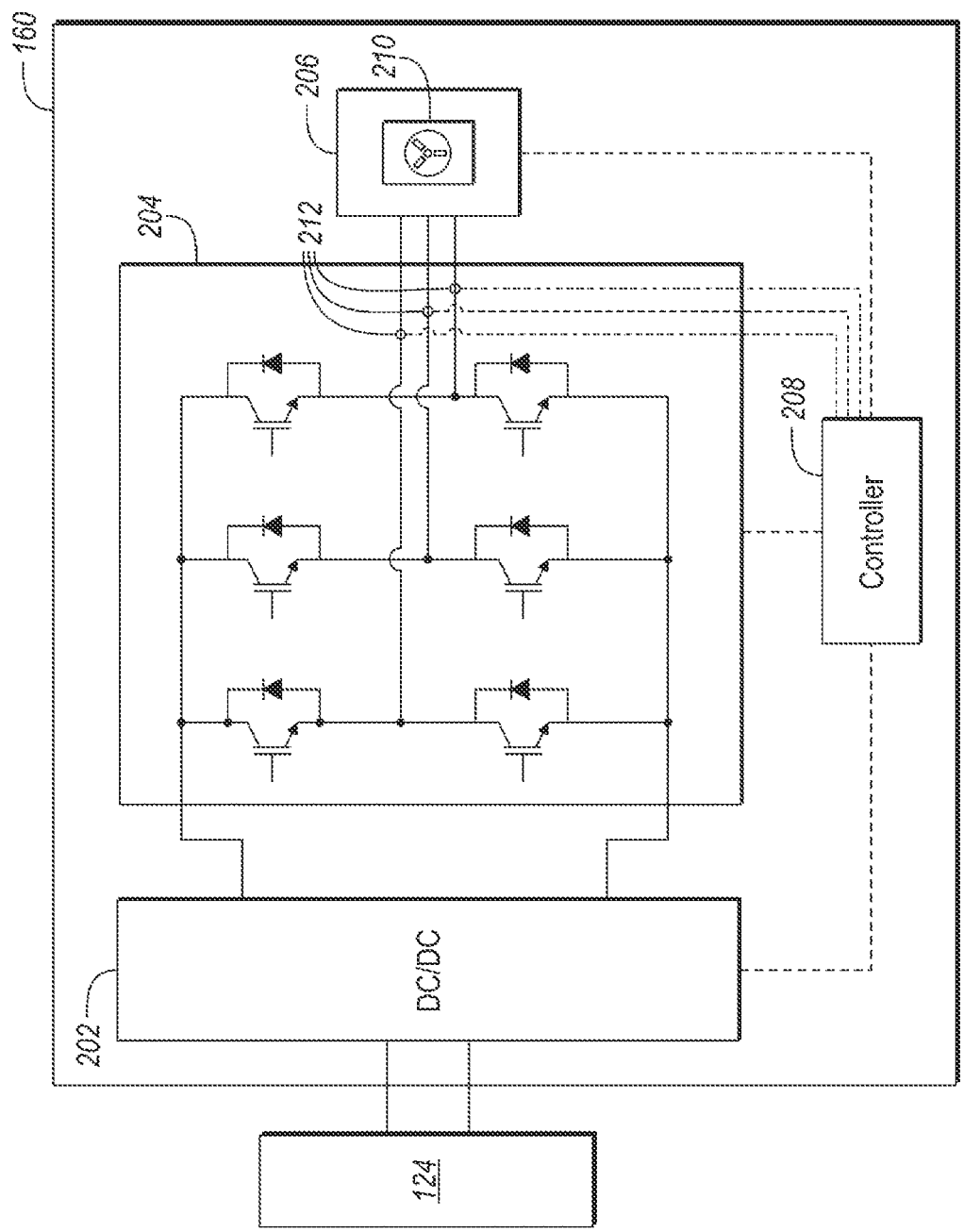
FIG. 2. depicts a possible configuration for a vehicle microgrid system for supplying power to external devices.

FIG. 2 depicts a possible diagram for the microgrid system 160. The microgrid system 160 may include a DC/DC power converter 202 that provides power to an inverter 204. The inverter 204 may be configured to convert a DC voltage input to an alternating current (AC) voltage output. The DC/DC power converter 202 may be configured to adjust the voltage level of the traction battery 124 or high-voltage bus 152 to a voltage level used by the inverter 204. The inverter 204 may be configured to provide one or more voltage outputs. For example, the inverter 204 may be configured to provide three-phase voltage outputs (e.g., three-phase inverter). The microgrid system 160 may include a controller 208. The controller 208 may be configured to operate the components of the microgrid system 160 including the DC/DC converter 202 and the inverter 204. The controller 208 may be integrated with the inverter 204. In some configurations, the controller 208 may be implemented as multiple controllers distributed or integrated with the other components.

The DC/DC power converter 202 may include inputs or terminals that are electrically coupled to the high-voltage bus 152 and the traction battery 124. The DC/DC power converter 202 may be configured to convert the voltage level of the high-voltage bus 152 to a desired voltage input level for the inverter 204. The DC/DC power converter 202 may include a bypass mode in which the voltage of the high-voltage bus is transferred to the inputs of the inverter 204. The DC/DC power converter 202 may include switching devices and circuit elements that are arranged and controlled to output the desired voltage level. The switching devices may be controlled by a controller (e.g., controller 208) that sequences the switching according to the desired power output. The DC/DC power converter 202 may include boost modes of operation that output a voltage that is greater than the voltage of the high-voltage bus 152. The DC/DC power converter 202 may include buck modes of operation that output a voltage that is less than the voltage of the high-voltage bus 152. The DC/DC power converter 202 may be an isolated converter or a non-isolated converter.

The inverter 204 may be configured to provide one or more voltage/current outputs. The inverter 204 may be configured to convert a DC voltage input into single-phase or multi-phase AC voltage outputs. The inverter 204 may be a three-phase inverter that is configured to provide three AC voltage/current waveforms. The inverter 204 may include power switching circuitry that includes a plurality of switching devices. The switching devices may be Insulated Gate Bipolar Junction Transistors (IGBTs) or other solid-state switching devices. The switching devices may be arranged to selectively couple a positive terminal and a negative terminal of the high-voltage bus 152 to each terminal or leg of the inverter power output. Each of the switching devices within the power switching circuitry may have an associated diode connected in parallel to provide a path for inductive current when the switching device is in a non-conducting state. Each of the switching devices may have a control terminal for controlling operation of the associated switching device. The control terminals may be electrically coupled to the controller 208. The controller 208 may include associated circuitry to drive and monitor the control terminals. For example, the control terminals may be coupled to the gate input of the solid-state switching devices.

Each leg of the inverter 204 may include a first switching device that selectively couples the HV-bus positive terminal to the associated output terminal. A first diode may be coupled in parallel to the first switching device. A second switching device may selectively couple the HV-bus negative terminal to the associated output terminal. A second diode may be coupled in parallel to the second switching device. Each inverter output leg may be similarly configured.

The controller (e.g., 208) may be programmed to operate the switching devices to control the voltage and current at the inverter outputs. The controller 208 may operate the switching devices so that each inverter output is coupled to only one of the HV-bus positive terminal or the HV-bus negative terminal at a particular time. Various power output algorithms and strategies are available to be implemented in the controller 208. The controller 208 may be programmed to cause the inverter 204 to output a target output voltage that is defined by a target amplitude and a target frequency. The controller 208 may be programmed to operate the inverter 204 and DC/DC converter 202 to achieve the target voltage waveform. The controller 208 may implement open-loop and/or closed loop strategies to achieve the result. The controller 208 may operate the switching devices with a pulse-width modulated (PWM) gate signal.

The inverter 204 may include current sensors 212 for each inverter power output. The current sensors 212 may be inductive or Hall-effect devices configured to generate a signal indicative of the current passing through the associated circuit. The controller 208 may sample the current sensors 212 at a predetermined sampling rate.

The controller 208 and/or inverter 204 may include one or more voltage sensors. The voltage sensors may be configured to measure an input voltage to the inverter 204 and/or one or more of the output voltages of the inverter 204. The voltage sensors may be resistive networks and include isolation elements to separate high-voltage levels from the low-voltage system. In addition, the inverter 204 may include associated circuitry for scaling and filtering the signals from the current sensors and the voltage sensors.

In some configurations, the DC/DC power converter 202 and inverter 204 may be integrated as a single unit. The overall function may remain as described. The end result is that the microgrid system 160 is configured to provide one or more power outputs. The microgrid system 160 may provide power outputs of varying power specifications. The power specifications may include voltage magnitude, current magnitude, and frequency. The controller 208 may be configured to operate the DC/DC power converter 202 and/or the inverter 204 to achieve power outputs with the requested power specifications. The microgrid system 160 may support a variety of different power specifications for different outlet panels 210. The microgrid system 160 may be configured to provide power having a range of desired frequencies and desired AC/DC voltage magnitudes. In addition, the microgrid system 160 may be configured to support simultaneous output of power signals having different power specifications (e.g., support multiple voltages with different magnitudes).

The microgrid system 160 may include an outlet interface 206. The outlet interface 206 may provide a mechanical and electrical interface to an outlet panel 210. The outlet interface 206 may include a housing that is configured to receive the outlet panel 210. The housing may include mechanical connection points for securing the outlet panel 210 to the housing. The outlet panel 210 may be secured by one or more fasteners and/or latching mechanisms.

The outlet interface 206 may be further configured to receive the power outputs from the inverter 204. The outlet interface 206 may be further configured to transfer the power outputs from the inverter 204 to the outlet panel 210. For example, the outlet interface 206 may include a circuit board within the housing having conductive traces for routing signals and power. The outlet interface 206 may include a connector or receptacle for receiving a mating connector of the outlet panel 210. The conductors of the connectors may be electrically coupled to the traces to facilitate the transfer of power and data signals to and from the outlet panel 210. The connector or receptacle may define the interface between the vehicle electrical system and the outlet panel 210.

Industrial and household systems generally use commonly available power connections. For example, household applications typically utilize 120 VAC electrical power. Other household applications may use 240 VAC electrical power. Industrial applications may utilize 240V three-phase AC electrical power. The outlet panel 210 may be designed to support a variety of power connections. Standards may be defined to identify particular plugs and connectors for each type of electrical power connection. The outlet panel 210 may be configured with a variety of outlets that provide power with different characterizing parameters.

The microgrid system 160 may be designed with predetermined operating specifications. For example, the microgrid system 160 may define maximum and rated current and voltage values. A rated or nominal current may be defined that is the current that can flow continuously with no issue. A maximum current may be defined that is the maximum amount of current that may flow without damaging the microgrid system 160. The maximum current may have an associated duration. The microgrid system 160 may be protected by fuses that are configured to open if a current exceeding the maximum current flows for a predetermined duration.

The controller 208 may implement general control strategies that support power specifications within a particular range of values. The controller 208 may operate the DC/DC converter 202 and the inverter 204 to achieve the target power specifications. In some configurations, the controller 208 may be programmed to implement a predetermined set of target power specifications. For example, the controller 208 may be programmed to implement typical household voltages and currents (e.g., 120 VAC, 240 VAC, 60 Hz).

Operation of the microgrid system 160 may be maintained during ignition-off periods. During this time, power may be provided by the traction battery 124. In addition, operation of the microgrid system 160 may be maintained during ignition-on periods. During ignition-on periods, power may be provided by the traction battery 124. In electrified vehicles that include an engine, power may be further provide by the electric machines 114 which may be operated as generators powered by the engine 118. This allows the microgrid system 160 to operate for potentially long periods of time. The microgrid system 160 may find use in vehicles for construction operations that may need a variety of power outlets at remote sites where power may not be available.

Figure 4A:
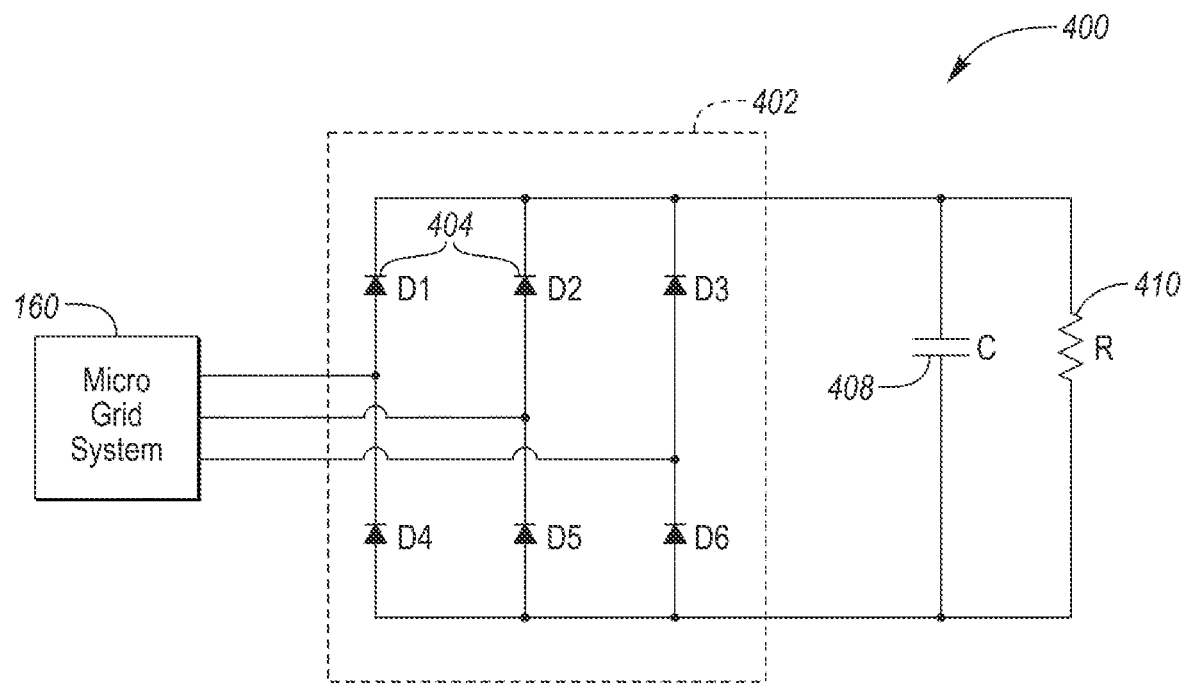
FIG. 4A depicts a diagram of diode rectifier-type load.

The microgrid system 160 may be configured to operate many types of external devices 166. Further, the microgrid system 160 may not have prior knowledge of the type of external device 166 to be connected. External devices 166 may have different time-varying impedance characteristics. For example, FIG. 4A depicts a schematic diagram 400 for an external device 166 that may include a diode rectifier 402. The diode rectifier 402 may be define an arrangement of diodes 404 that is configured to convert an AC voltage/current to a generally DC voltage/current. The diodes 404 may be arranged such that each line conductor from the microgrid system 160 is connected to a side of a load via one of the diodes 404.

The load circuit may further include a capacitance 408 and a resistance 410 arranged in a circuit. Such loads may have a large inrush current. The inrush current may be defined as the current demanded by the circuit during startup conditions. That is, when the circuit is not energized for a period of time such that there are no voltages or currents present in the circuit. Due to the capacitance 408, the inrush current may be large until the capacitance 408 has charged to a predetermined voltage level. Such loads may appear briefly as a short circuit at the output terminals of the microgrid system 160. Note that other circuit configurations are possible without limitation.

Figure 4B:
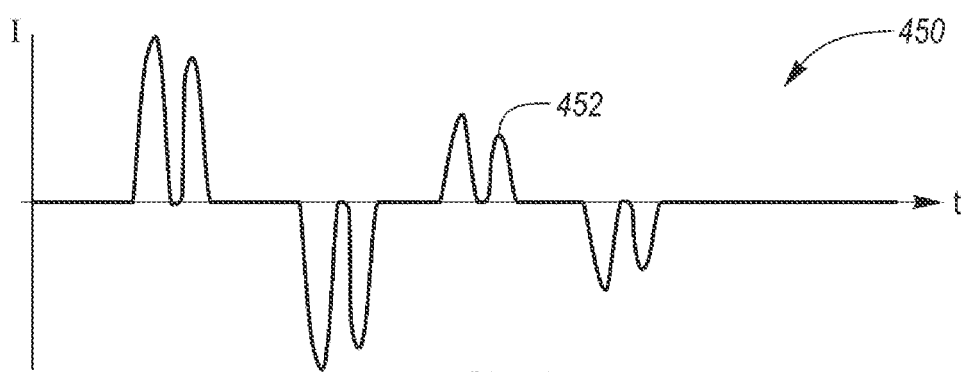
FIG. 4B depicts a graph of typical microgrid system output current for the diode rectifier-type load.

FIG. 4B depicts a graph 450 of a typical current profile 452 for one of the line currents. The current profile 452 for a diode rectifier-type load exhibits discontinuous pulses of current and may exhibit large amount of total harmonic distortion (THD). During startup when the capacitance 408 is charging, the current peaks can be large. During the inrush phase, the current peaks may be larger than the current peaks that are observed at steady-state.

The microgrid system 160 may be configured to provide a predetermined rated current. The rated current may be the amount of current that the microgrid system 160 can continuously supply without issue. In addition, the microgrid system 160 may be configured to provide a predetermined maximum current. The maximum current may an amount of current that the microgrid system 160 may supply for a specific time duration. Above the maximum current, the microgrid system 160 may turn off by hardware and/or software operation to prevent damage. For example, the microgrid system 160 may include a fuse to protect the hardware that is rated at a predetermined current.

Figure 5A:
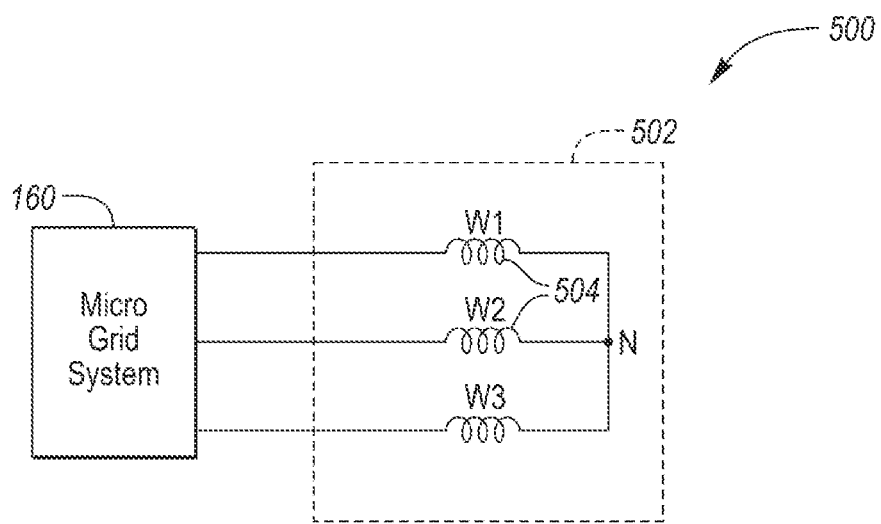
FIG. 5A depicts a diagram of an induction machine load.

FIG. 5A depicts a schematic diagram 500 for an external device 166 that is an induction machine 502. The induction machine 502 may include phase windings 504 for each motor phase. Each phase winding 504 may be coupled to one of the lines of the microgrid system 160. The induction machine 502 may have a large inrush current when starting from standstill. The inrush current may be a factor of three to ten times larger than a nominal rated current of the induction machine 502. The inrush current may be present for a duration of up to ten seconds depending on the specific induction machine.

The inrush current presents a design challenge for the microgrid system 160. If the microgrid system 160 is designed for the rated current of the external device 166, it cannot handle the startup process without trigging an over-current condition. However, the microgrid system 160 may be substantially over-designed if it is configured to handle the inrush current. Under most conditions, the microgrid system 160 would be underutilized. As such, the microgrid system 160 may be costlier to produce.

Figure 5B:
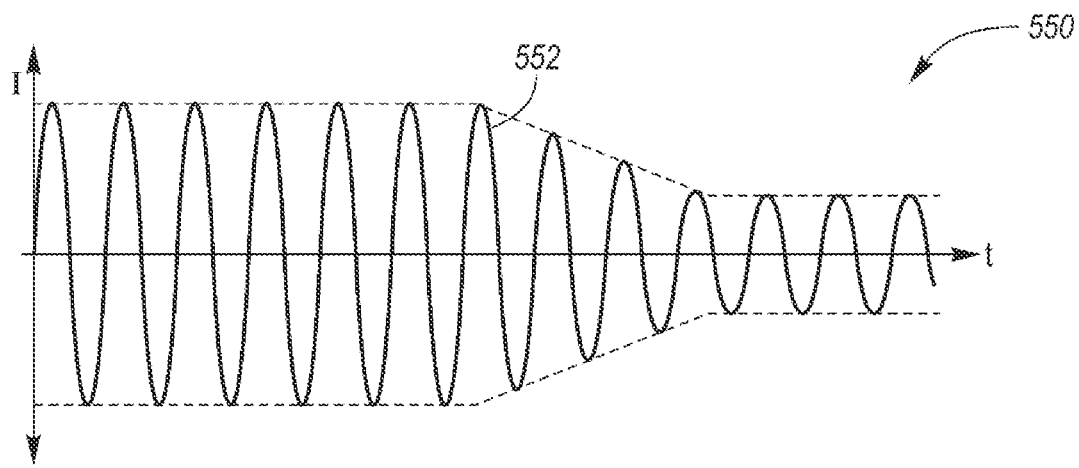
FIG. 5B depicts a graph of typical microgrid system output current for the induction machine load.

FIG. 5B depicts a graph 550 of a typical current profile 552 for one of the line currents. The current profile 552 for the induction machine-type load is continuous and generally sinusoidal and may exhibit relatively low amount of THD. During startup, the peak current may be large before settling to a rated current or steady-state value.

For applications in which the load characteristics are known, the power supply system can be designed to prevent issues. For example, a soft-start control strategy may be implemented to gradually increase the speed of the induction machine 502 to prevent large inrush currents. The soft-start control may operate by ramping up the voltage and frequency of the supplied voltage to prevent large inrush currents. However, in the present application, the microgrid system 160 does not know the type of load that is being connected. As such, implementing a soft-start strategy at all times may not be effective and could be performed when not needed.

An improved solution is to alter the control strategy when detecting an inrush current event. The system may be configured to detect an inrush current event based on voltage and current measurements of the output of the inverter 204. An inrush current event detection may be enabled when there is no load connected to the microgrid system 160. No load may be detected when the current is less than a near-zero threshold. In addition, inrush current event detection may be enabled when there is a steady-state current being drawn by the load. A steady-state current may be indicative of the inrush phase being completed. The steady-state current may be less than the rated current for the microgrid system 160. Enabling the inrush event detection after a steady-state condition is achieved allows for inrush detection if another load is connected. Detection of the inrush current event may be enabled when detecting that a load is connected or enabled.

Several techniques for identifying an inrush current event may be available. For example, an inrush current event may be detected when a rate of change (di/dt) of the output current of the inverter 204 exceeds a predetermined threshold (e.g., di/dt exceeds 1 A/ns). In other examples, an inrush current event may be detected when a magnitude of the output current exceeds a predetermined multiple (e.g., 3× or 4×) of an inverter rated current. In other examples, an inrush current event may be detected when a magnitude of the output current exceeds a predetermined current for a predetermined amount of time (e.g., 1.5× inverter rated current for more than 2 seconds). The inrush event detection may implement any combination of the above-mentioned strategies to detect an inrush event. Other strategies may be possible and are applicable to the system.

Responsive to an inrush current event being detected, the controller 208 may be programmed to implement a strategy to reduce or prevent the inrush current. The controller 208 may be programmed to operate the inverter 204 to change the output voltage amplitude and the associated frequency. The output voltage amplitude and frequency may be reduced in an attempt to lower the inrush current. The controller 208 may operate the DC/DC converter 202 to reduce the voltage provided to the inverter 204. The amount of the reduction in the frequency and amplitude may be based on the level of inrush current that is measured.

Figure 3A:
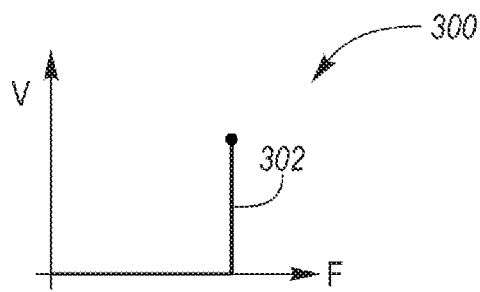
FIGS. 3A-3E depict possible voltage/frequency curves for adjusting voltage output of a microgrid system.
Figure 3B:
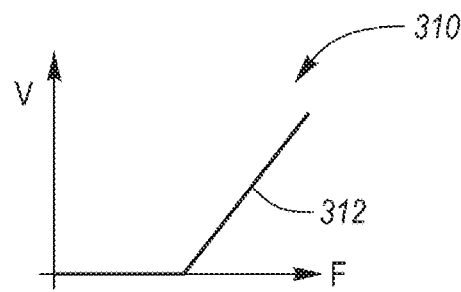
Figure 3C:
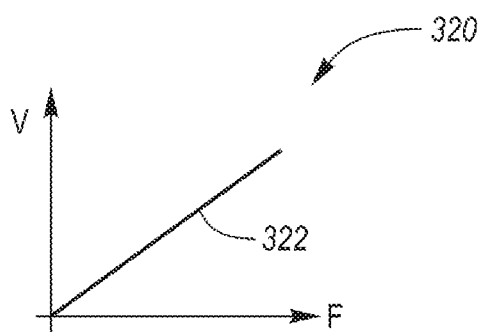
Figure 3D:
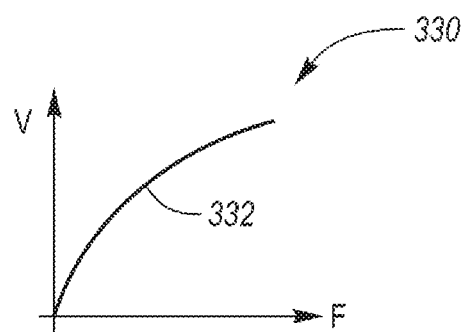
Figure 3E:
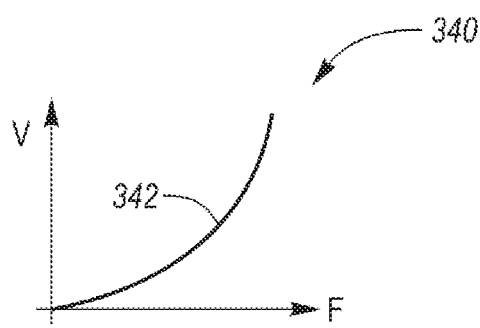

After reducing the voltage, the controller 208 may be programmed to then increase the voltage amplitude and frequency back to the target or steady-state voltage over a period of time following one of several possible voltage to frequency ratio trajectories. The amount of voltage or amplitude increase may follow a predetermined profile for returning to the steady-state waveform. For example, a predetermined time for returning the voltage amplitude to the steady-state amplitude may be defined. The voltage amplitude may then increase linearly. The voltage amplitude increase may also be determined based on the output current magnitude. The voltage amplitude increase may be larger when the current magnitude is lower. The frequency may be determined based on the voltage amplitude and the selected voltage to frequency ratio trajectories. For example, once the voltage amplitude is selected a frequency may be selected to satisfy the selected voltage to frequency ratio trajectory. FIGS. 3A-3E depicts examples of possible voltage amplitude to frequency ratio trajectories that may followed. FIG. 3A depicts a strategy in which a single voltage/frequency relationship is output. FIG. 3B depicts a strategy in which the voltage/frequency ratio is increased linearly starting from a predetermined frequency. FIG. 3C depicts a strategy in which the voltage/frequency ratio changes linearly starting from zero frequency. FIG. 3D depicts a strategy in which the voltage/frequency ratio rises nonlinearly from zero with a more rapid increase at lower frequencies. FIG. 3E depicts a strategy in which the voltage/frequency ratio rises nonlinearly from zero with a slower increase rate at lower frequencies. The strategy selected may depend on the type of load and magnitude of the inrush current.

Other strategies may include a closed-loop current control that limits the amount of current provided to the external device 166. When the current exceeds a predetermined current that is indicative of an inrush current, the controller 208 may reduce the voltage amplitude and frequency by an amount dictated by the amount the current exceeds the predetermined current.

The inrush current limiting strategies prevents excessive inrush currents that may trigger overcurrent detection in the inverter 204. The strategies also allow a lower current rated inverter 204 to be used. This may affect the size and cost of the microgrid system 160. The size may be reduced as the inverter 204 may be designed for lower current handling.

Figure 6:
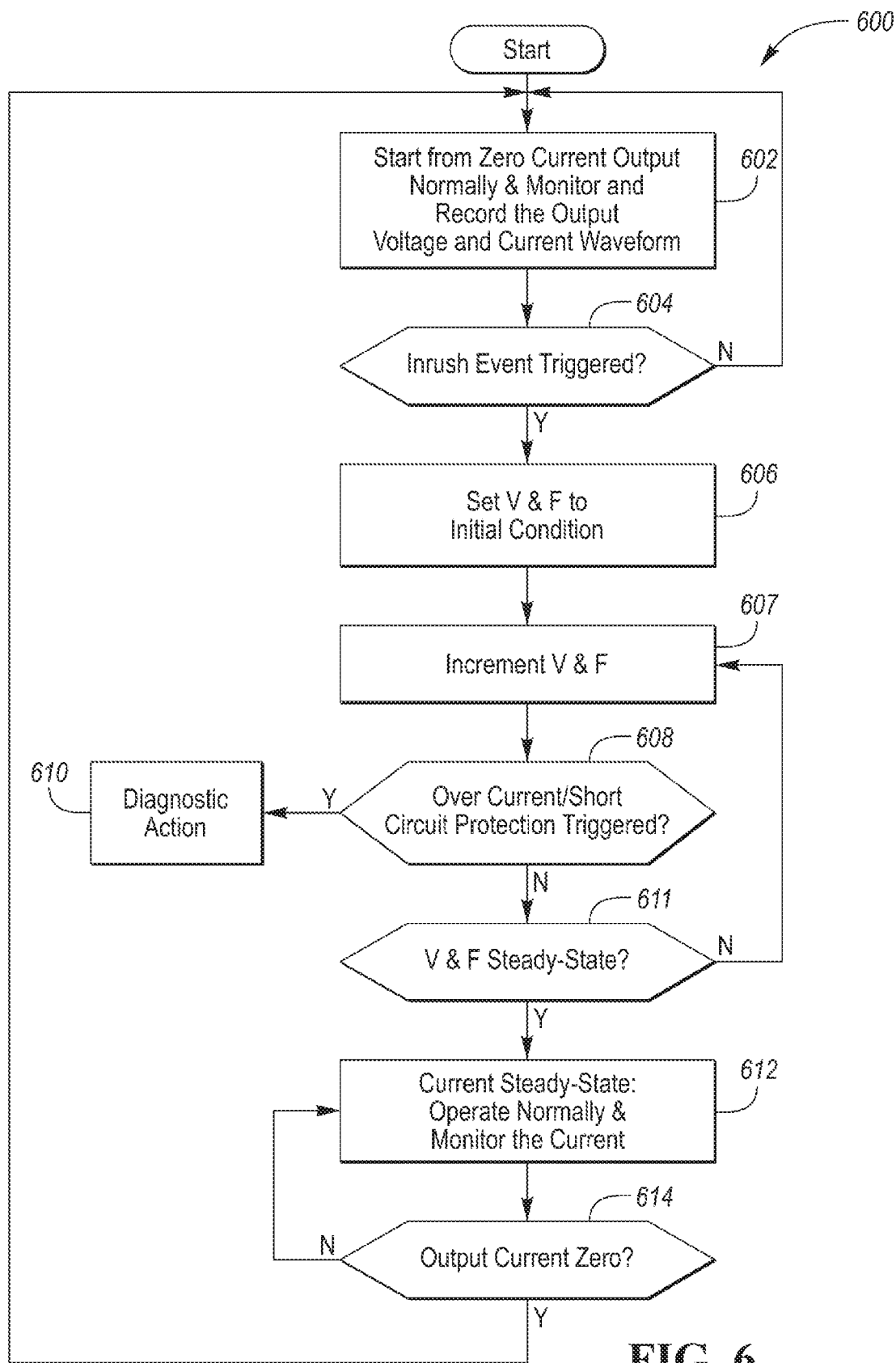
FIG. 6 depicts a flowchart for a possible sequence of operations for avoiding large inrush currents for a single load.

FIG. 6 depicts a flow chart 600 for a possible sequence of operations that may be implemented in the controller 208 for monitoring a single-load configuration. At operation 602, the microgrid system 160 may be operated normally starting from zero current. Normal operation may include operating the inverter 204 to provide a target or steady-state voltage at a target or steady-state frequency. Normal operation may include outputting a voltage at a steady-state amplitude and a steady-state frequency without any ramping of the voltage/frequency. The controller 208 may be programmed to monitor and record the output voltages and currents by sampling the currents sensors 212 and voltage sensors. The measured data may be stored in non-volatile memory. The measurements over time may define a voltage profile and/or a current profile that may be analyzed to determine the type of load that is connected.

At operation 604, a check may be performed to detect if an inrush current event has been initiated. The controller 208 may be programmed to implement the inrush current detection strategies as described above herein. If no inrush current event is detected, operation 602 may be performed.

If an inrush current event is triggered at operation 604, operation 606 may be performed. At operation 606, the microgrid system 160 may be operated to set the voltage amplitude and frequency to an initial condition. The initiation condition may be at an operating level that reduces the output voltage amplitude and frequency. The controller 208 may operate the inverter 204 and the DC/DC converter 202 to achieve the change in the output voltage.

At operation 607, the controller 208 may be programmed to increase the voltage amplitude and frequency with a selected voltage to frequency ratio trajectory to return the output voltage and frequency to the target steady-state levels. One of the voltage amplitude or the frequency may be increased to the corresponding steady-state values at a predetermined rate. Alternatively, one of the voltage amplitude or the frequency may be increased at a variable rate that depends on other factors (e.g., output current magnitude, difference from steady-state values). The other parameter may be changed according to the voltage to frequency ratio trajectory.

At operation 608, the controller 208 may check for overcurrent or short-circuit conditions. The controller 208 may compare the output current magnitude to a predetermined overcurrent or short-circuit current threshold. The threshold may correspond to the maximum current rating for the microgrid system 160. The controller 208 may also consider a rate of change of the output current magnitude. If the output magnitude exceeds the overcurrent threshold, operation 610 may be performed. At operation 610, a diagnostic action may be performed. The diagnostic action may be to log a diagnostic condition and/or shut down the microgrid system 160 to protect from damage. If the output magnitude is less than the overcurrent threshold, operation 611 may be performed.

At operation 611, a check may be performed to determine if the voltage and frequency have achieved a steady-state value. For example, the voltage amplitude and frequency may be compared to the target steady-state values. If the voltage and frequency have achieved steady-state, operation 612 may be performed. If the voltage and frequency have not reached the steady-state values, then operation 607 may be repeated.

At operation 612, the microgrid system 160 may be operated normally to provide voltage and current to the connected load when the current is in a steady-state. The current being in a steady-state does not necessarily indicate a constant current. The current may vary to some degree, but the variations are not at levels that occur during the inrush phase. The controller 208 may continue to measure and monitor the current. At operation 614, a check may be performed to determine if the output current has dropped to zero. For example, the controller 208 may be programmed to check if the output current magnitude is less than a near-zero threshold ($I_0$). If the output current magnitude is less than the near-zero threshold, the inrush current monitoring is reactivated (e.g., returns to operation 602). If the output current magnitude is at or exceeds the near-zero threshold, operation 612 may be repeated.

Figure 7:
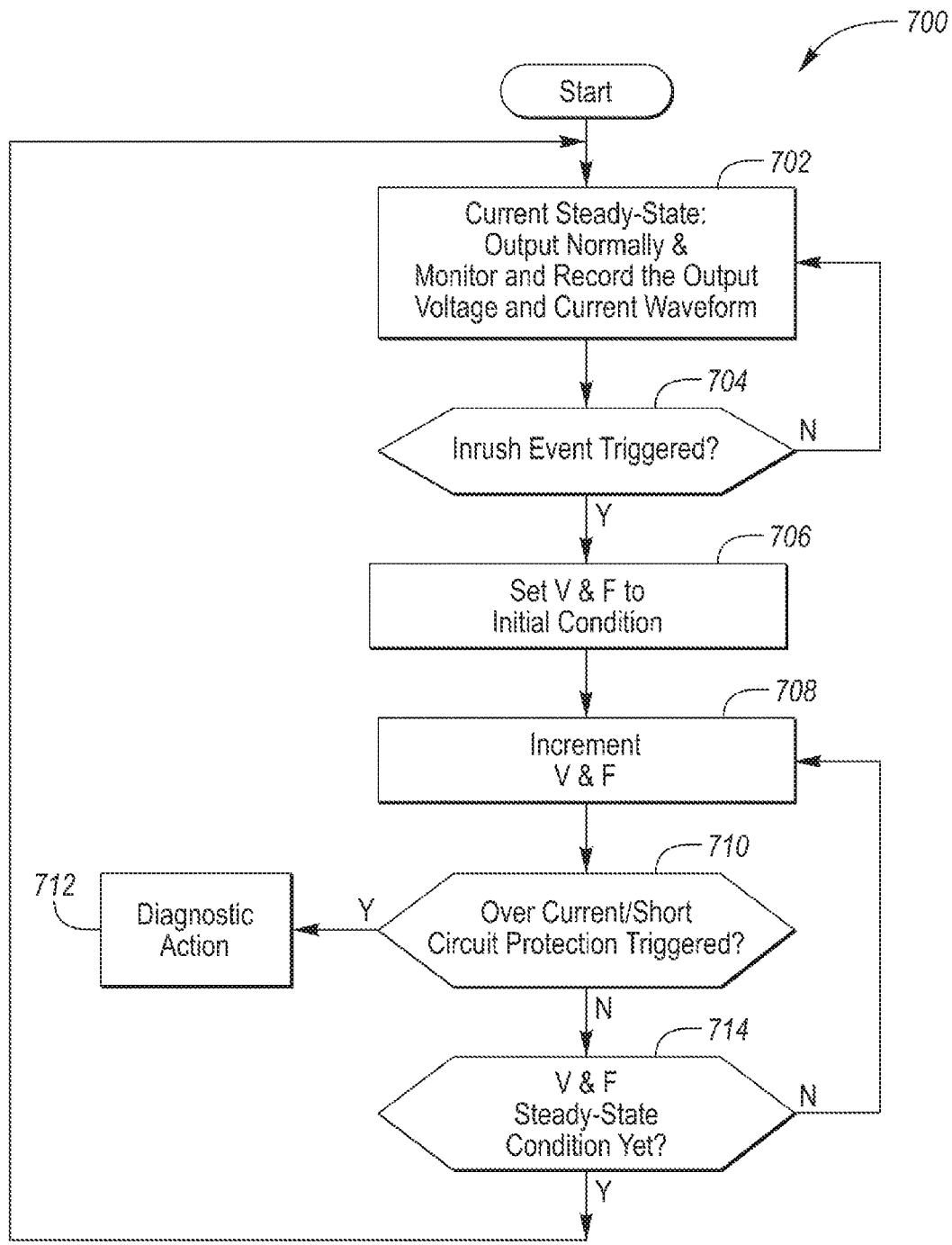
FIG. 7 depicts a flowchart for a possible sequence of operations for avoiding large inrush currents when plugging in an additional load.

FIG. 7 depicts a flow chart 700 for a possible sequence of operations that may be implemented in the controller 208 for handling a multiple-load configuration. In a multiple-load configuration, it may be possible the more than one external device is being supplied by the microgrid system 160. In some cases, a first load may already be connected and drawing current when a second load is connected. The second load may cause an inrush current event when connected. At operation 702, the microgrid system 160 may be operated normally at a steady-state voltage and frequency. A load may be at zero current or may be operating at a steady-state current value. The controller 208 may be programmed to monitor and record the output voltages and currents by sampling the current sensors 212 and voltage sensors. The measured data may be stored in non-volatile memory.

At operation 704, a check may be performed to detect if an inrush current event has been triggered. The controller 208 may be programmed to implement the inrush current detection strategies as described above herein. However, in the case of an already operating load, inrush detection thresholds may be adjusted since the operating load is already drawing some amount of current. If no inrush current event is detected, operation 702 may be repeated. If an inrush current event is detected, operation 706 may be performed.

At operation 706, the controller 208 may adjust the output voltage amplitude and frequency to an initial condition. The initial condition may account for the operating load. For example, the control strategy may try to minimize the impact on the already operating load if possible. The initial condition may reduce the voltage amplitude and frequency from the steady-state target values.

At operation 708, the output voltage amplitude and frequency (e.g., voltage/frequency ratio) may be increased according to one of the trajectories up to a target ratio. At operation 710, the controller 208 may check for overcurrent or short-circuit conditions. The controller 208 may compare the output current magnitude to a predetermined overcurrent or short-circuit current threshold. The controller 208 may also consider a rate of change of the output current magnitude. If the output current magnitude exceeds the overcurrent threshold, operation 712 may be performed. At operation 712, a diagnostic action may be performed. The diagnostic action may be to log a diagnostic condition and/or shut down the microgrid system 160 to protect from damage. If the output current magnitude is less than the overcurrent threshold, operation 714 may be performed for normal operation.

At operation 714, the controller 208 may check if a steady-state condition is attained. A steady-state condition may be detected when the inrush current event is completed. The controller 208 may monitor the output currents and voltages to determine the steady-state condition. The steady-state condition may also be detected when the target steady-state voltage and frequency have been achieved. The steady-state condition may also be detected after a predetermined time duration. If the steady-state condition is not detected, operations starting from 708 may be repeated. If the steady-state condition is detected, the sequence may be repeated starting at operation 702. The inrush event thresholds may be adjusted to reflect the steady-state current drawn by the load.

Figure 8:
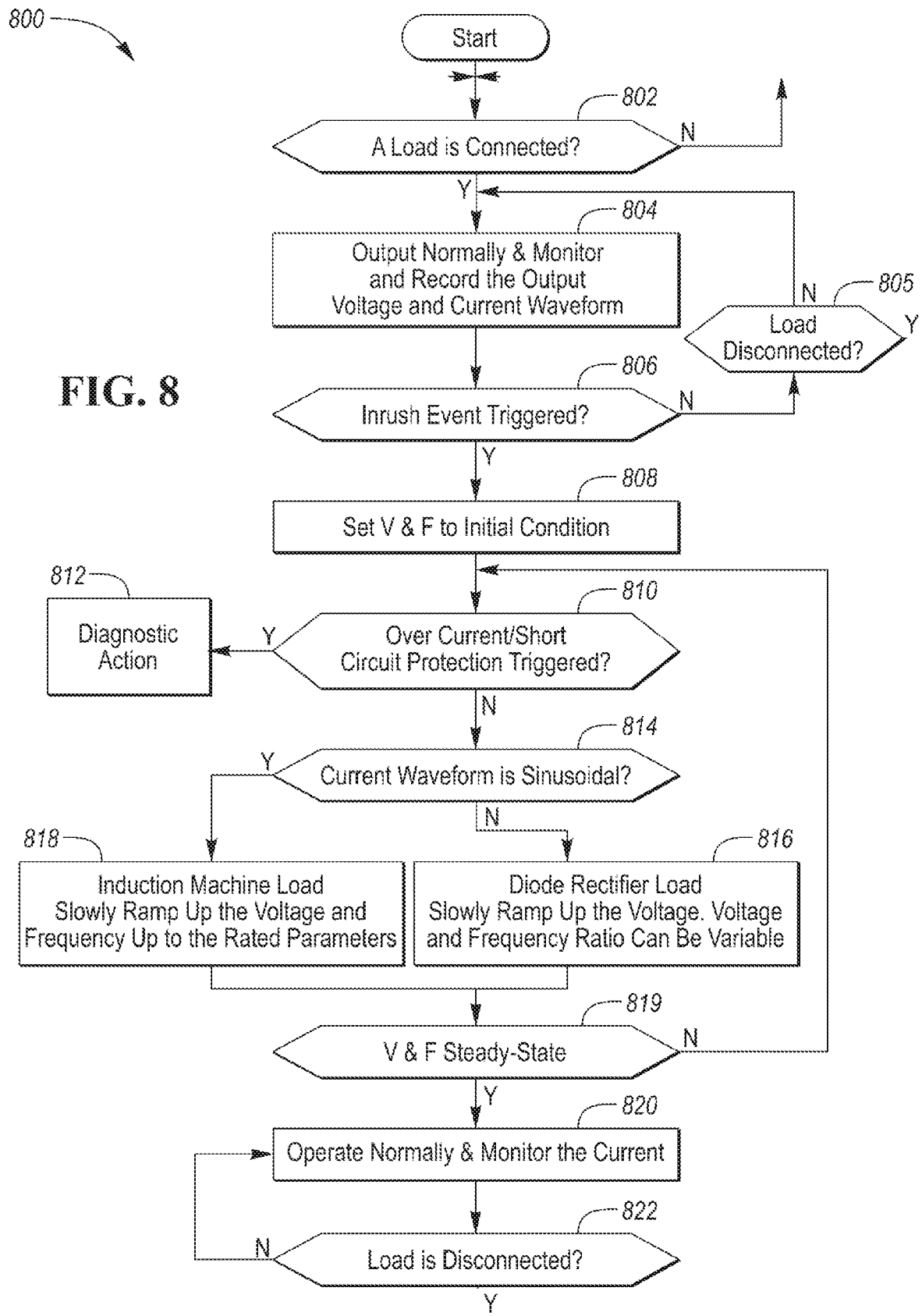
FIG. 8 depicts a flowchart for a possible sequence of operations for avoiding large inrush currents and identifying the type of load that is connected.

FIG. 8 depicts a flow chart 800 for a possible sequence of operations that may be implemented in the controller 208 for handling inrush current events and detecting a type of load that is connected to the microgrid system 160. At operation 802, the controller 208 may check conditions to determine if a load is connected. A load may be detected responsive to the output current exceeding a threshold. In some configurations, the controller 208 may receive a signal indicative of a load being connected. For example, a switch or contact may be engaged when a plug is inserted. If no load is detected, operation 802 may be repeated. If a load is detected, operation 804 may be performed.

At operation 804, the microgrid system 160 may be operated normally. For example, the controller 208 may operate the inverter 204 to output a voltage according to a target steady-state voltage profile. The target voltage profile may include a target amplitude and a target frequency. The controller 208 may be programmed to monitor and record the output voltages and currents by sampling the current sensors 212 and voltage sensors. The measured data may be stored in non-volatile memory.

At operation 806, a check may be performed to detect if an inrush current event has been triggered. The controller 208 may be programmed to implement the inrush current detection strategies as described above herein. If no inrush current event is detected, operation 805 may be performed. At operation 805, the microgrid system 160 may perform a check to determine if the load has been disconnected. For example, the controller 208 may be programmed to check if the output current is less than a near-zero threshold. If the output current is less than the near-zero threshold, the inrush current monitoring may be reactivated (e.g., returns to operation 802). If the output current is at or above the near-zero threshold, operation 804 may be repeated.

If an inrush current event is triggered at operation 806, operation 808 may be performed. At operation 808, the microgrid system 160 may be operated to set the voltage amplitude and frequency to reduce the inrush current. The controller 208 may operating the inverter to reduce the output voltage amplitude and frequency from the steady-state target values.

At operation 810, the controller 208 may check for overcurrent or short-circuit conditions. The controller 208 may compare the output current magnitude to a predetermined overcurrent or short-circuit current threshold. The controller 208 may also consider a rate of change of the output current magnitude. If the output magnitude exceeds the overcurrent threshold, operation 812 may be performed. At operation 812, a diagnostic action may be performed. The diagnostic action may be to log a diagnostic condition and/or shut down the microgrid system 160 to protect from damage. If the output current magnitude is less than the overcurrent threshold, operation 814 may be performed.

At operation 814, the controller 208 may check to determine the type of load that is connected. The controller 208 may examine the output current that is derived from monitoring the current sensors 212. The type of load may be used to manage the inrush current event. The controller 208 may be programmed to determine if the output current profile is generally sinusoidal (e.g., as in FIG. 5B). Various method may be implemented to determine if the output current profile is generally sinusoidal. The controller 208 may be programmed to detect zero crossings and peak values to determine the profile type. In other configurations, a Fast Fourier Transform (FFT) algorithm may be applied to determine the harmonic content of the current profile.

The current profile may be sinusoidal if an FFT magnitude has a distinct peak at one frequency. If the current profile is sinusoidal, operation 818 may be performed. If no inrush current event is detected, the type of load may be identified as a non-inrush type load (e.g., resistive load). In other examples, the THD may be computed as:

$$THD = \frac{\sqrt{I_2^2 + I_3^2 + \ldots}}{I_1} \qquad (1)$$

where $I_1$ is the amplitude of the fundamental frequency and $I_2$, $I_3$ are the amplitudes of the harmonics. Note that additional harmonics amplitudes may be included in the THD computation. When the amplitude of the fundamental frequency dominates, the THD value may be relatively low. The current profile may be sinusoidal if the THD value is less than a predetermined threshold. When the harmonic amplitudes dominate, the THD value may be relatively high. The current profile may be non-sinusoidal if the THD value is greater than the predetermined threshold.

The type of load may be stored in non-volatile memory. Further, the controller 208 may be programmed to anticipate the type of load connected based on the history of the loads connected previously.

At operation 818, the controller 208 may indicate that an induction machine load is connected. During the inrush phase, the controller 208 may operate the inverter 204 to ramp the voltage and frequency up to the rated parameters at a predetermined rate. The controller 208 may maintain the voltage/frequency ratio at a predetermined or constant ratio (e.g., FIG. 3C).

If the current profile is not sinusoidal, operation 816 may be performed. At operation 816, the controller 208 may indicate that a diode rectifier-type load is present. During the inrush phase, the controller 208 may operation the inverter 204 to ramp the voltage and frequency up to the rated parameters. The controller 208 may vary the voltage/frequency ratio during the ramp (e.g., FIG. 3D, FIG. 3E).

At operation 819, the controller 208 may then perform a check to determine if the voltage and frequency have returned to the steady-state target values. If the voltage and frequency have not returned to the steady-state values, then operations starting from operation 810 may be repeated. If the voltage and frequency have returned to the steady-state target values, then operation 820 may be performed.

After the inrush event is completed, operation 820 and operation 822 may be performed to achieve normal operation of the microgrid system 160 at the updated steady-state operating current. At operation 822, if the load is disconnected, the sequence starting from operation 802 may be repeated.

The system and methods described improve operation of a microgrid system for vehicles. The system protects the microgrid system from excessive currents caused by inrush conditions. The system actively attempts to control the inrush current to manageable levels such that the microgrid system avoids diagnostic actions that may shut down the system.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an inverter configured to provide power to an external device; and
   a controller programmed to cause the inverter to output a voltage at a steady-state amplitude and a steady-state frequency and, responsive to detecting an inrush current event caused by the external device, reduce an amplitude and a frequency of the voltage to prevent an output current of the inverter from exceeding a threshold, and return the amplitude to the steady-state amplitude and the frequency to the steady-state frequency by increasing the amplitude and the frequency to maintain a constant amplitude to frequency ratio responsive to a profile of the output current being sinusoidal.

2. The vehicle of claim 1 wherein controller is further programmed to return the amplitude to the steady-state amplitude and the frequency to the steady-state frequency by increasing the amplitude and the frequency such that an amplitude to frequency ratio of the voltage varies while increasing responsive the profile of the output current being non-sinusoidal.

3. The vehicle of claim 1 wherein the controller is further programmed to detect an inrush current event responsive to a rate of change of the output current exceeding a predetermined rate of change.

4. The vehicle of claim 1 wherein the controller is further programmed to detect an inrush current event responsive to an amplitude of the output current exceeding a predetermined amplitude for greater than a predetermined duration.

5. The vehicle of claim 1 wherein the threshold is an overcurrent threshold for the inverter.

6. The vehicle of claim 1 wherein the controller is further programmed to, responsive to the output current exceeding the threshold for greater than a predetermined duration, operate the inverter to cease output the voltage.

7. The vehicle of claim 1 wherein the controller is further programmed to increase the amplitude to the steady-state amplitude at a predetermined rate.

8. The vehicle of claim 1 wherein the controller is further programmed to increase the frequency to the steady-state frequency at a predetermined rate.

9. The vehicle of claim 1 wherein the controller is further programmed to increase the amplitude to the steady-state amplitude at a variable rate.

10. A vehicle system comprising:
    a controller programmed to operate an inverter to output a voltage waveform to power an external device and, responsive to detecting connection of the external device followed by an inrush current event caused by the external device, operate the inverter to reduce a frequency and amplitude of the voltage waveform to prevent an output current of the inverter from exceeding a threshold, and increase the frequency and amplitude according to an amplitude to frequency ratio trajectory that is based on a profile of the output current.

11. The vehicle system of claim 10 wherein the controller is further programmed to detect the inrush current event responsive to the output current exceeding a current threshold that is greater than a rated current of the inverter.

12. The vehicle system of claim 10 wherein the controller is further programmed to detect the inrush current event responsive to a rate of change of the output current exceeding a predetermined rate of change.

13. The vehicle system of claim 10 wherein the controller is further programmed to, responsive to a total harmonic distortion value derived from the profile being less than a predetermined threshold, follow an amplitude to frequency ratio trajectory that defines a constant amplitude to frequency ratio.

14. The vehicle system of claim 10 wherein the controller is further programmed to, responsive to the profile of the output current being sinusoidal, follow an amplitude to frequency ratio trajectory that defines a constant amplitude to frequency ratio.

15. The vehicle system of claim 10 wherein the controller is further programmed to, responsive to the profile of the output current being non-sinusoidal, follow an amplitude to frequency ratio trajectory that defines a varying amplitude to frequency ratio.

16. A method comprising:
by a controller,
operating an inverter to output a voltage at a steady-state amplitude and a steady-state frequency to power an external device;
reducing an amplitude and a frequency of the voltage to prevent an output current of the inverter from exceeding a threshold, responsive to detecting an inrush current event caused by the external device; and
increasing the amplitude and the frequency to maintain a constant amplitude to frequency ratio responsive to a profile of the output current being sinusoidal to return the amplitude to the steady-state amplitude and the frequency to the steady-state frequency.

17. The method of claim 16 further comprising increasing the amplitude and the frequency with a variable amplitude to frequency ratio responsive to the output current being non-sinusoidal.

18. The method of claim 16 further comprising detecting the inrush current event responsive to a rate of change of the output current exceeding a predetermined rate of change.

19. The method of claim 16 further comprising detecting the inrush current event responsive to an amplitude of the output current exceeding a predetermined amplitude for a time exceeding a predetermined duration.

20. The method of claim 16 further comprising increasing the amplitude and the frequency to maintain a constant amplitude to frequency ratio responsive to the profile of the output current having a total harmonic distortion that is less than a predetermined threshold.

* * * * *